US005597994A

United States Patent [19]

Hornung

[11] Patent Number: 5,597,994

[45] Date of Patent: Jan. 28, 1997

[54] INFORMATION DISPLAY SYSTEM

[76] Inventor: Thomas Hornung, 144 Wimbleton Dr., Birmingham, Mich. 48009

[21] Appl. No.: 455,594

[22] Filed: May 31, 1995

Related U.S. Application Data

[63] Continuation of Ser. No. 161,801, Dec. 6, 1993, abandoned.

[51] Int. Cl.[6] .................................................... G06F 17/00

[52] U.S. Cl. ............................ 235/375; 235/473; 40/471

[58] Field of Search .................................... 235/375, 462, 235/473; 40/470, 471, 518; 341/26; 345/1, 2

[56] References Cited

U.S. PATENT DOCUMENTS

| | | | |
|---|---|---|---|
| 3,255,445 | 7/1966 | Randel | 345/2 |
| 3,273,140 | 9/1966 | Foster et al. | 340/334 |
| 3,474,556 | 10/1969 | Scovill | 40/471 |
| 3,594,762 | 7/1971 | Gardberg et al. | 345/1 |
| 3,614,727 | 10/1971 | Fritts | 340/22 |
| 3,803,582 | 4/1974 | McKee et al. | 340/324 B |
| 3,822,493 | 7/1974 | Maley | 40/471 |
| 3,835,297 | 9/1974 | Inoue et al. | 235/473 |
| 3,886,328 | 5/1975 | Harms, Jr. et al. | 235/473 X |
| 4,029,944 | 6/1977 | Trenkamp | 235/473 |
| 4,617,554 | 10/1986 | Krause et al. | 341/26 |
| 4,638,170 | 1/1987 | Kubota | 235/473 |
| 5,128,519 | 7/1992 | Tokuda | 235/462 |
| 5,142,277 | 8/1992 | Yarberry et al. | 340/825.57 |
| 5,164,574 | 11/1992 | Ujiie et al. | 235/462 |
| 5,293,484 | 3/1994 | Dabbs, III et al. | 395/164 |

FOREIGN PATENT DOCUMENTS

| | | | |
|---|---|---|---|
| 2005926 | 10/1970 | Germany | 40/31 |

*Primary Examiner*—Donald T. Hajec
*Assistant Examiner*—Steven Wigmore
*Attorney, Agent, or Firm*—Gifford, Krass, Groh, Sprinkle, Patmore, Anderson & Citkowski, P.C.

[57] ABSTRACT

An information display system is disclosed having a housing with a viewing window. An elongated flexible sheet is contained within the housing and a plurality of discrete visual messages are provided at longitudinal spaced intervals along the sheet while a controllable motor is mechanically drivenly connected with the sheet to control the position of the sheet. A coded index is also associated with each discrete visual message on the sheet. A microprocessor based central control unit receives input from a user via a keyboard of the desired visual message to be displayed through the housing window. After the user inputs the desired message, the control unit outputs control signals to a motor control module associated with the controllable motor. The motor control module decodes the output signal and then selectively activates the controllable motor in the housing to change the positioning of the sheet until the desired or target visual message is positioned in alignment with the housing viewing window.

14 Claims, 4 Drawing Sheets

INFORMATION DISPLAY SYSTEM

This is a continuation of application Ser. No. 08/161,801 filed Dec. 6, 1993 now abandoned.

BACKGROUND OF THE INVENTION

I. Field of the Invention

The present invention relates generally to information display systems and, more particularly, to an information display system having an elongated MYLAR (polyethyleneterpthalate) sheet upon which a plurality of longitudinal spaced discrete visual messages are provided.

II. Description of the Prior Art

There are many situations in which it is desirable to display visual information. For example, many buses and other public transportation typically have an information display unit positioned at the front and/or back of the bus which displays information indicative of the bus destination or route.

There have been a number of previously known different types of display systems. In one type, an elongated MYLAR sheet or curtain is contained within the housing around two spaced rollers. The portion of the sheet extending between the rolls is in alignment with a window formed in the housing so that only a portion of the sheet is viewable at any given time. Furthermore, a plurality of discrete visual messages are provided at longitudinally spaced positions along the sheet so that the messages can be changed by changing the position of the MYLAR sheet along the rollers.

One disadvantage of these previously known MYLAR display systems is that it is necessary for the vehicle operator to manually change the position of the MYLAR sheet. In order to do this, it is necessary for the operator to manually move each curtain or sheet using a hand crank or integral drive motor. This is time consuming since buses may have as many as sixteen curtains while subways and trains can have more than thirty two curtains.

There are other information display systems that utilize illuminated lights, or dots, or mechanical dots in a dot matrix pattern in order to form messages. By selectively illuminating the lights, words or phrases are formed on the display.

These previously known display systems with illuminated lamps or dots, however, lack the clarity and definition that can be obtained from the display systems utilizing MYLAR sheets. Such lack of resolution and clarity make the sign much more difficult to read and, for that reason, is undesirable. A still further disadvantage of such systems is that the lamps must be periodically replaced as they wear out which increases the overall cost of the display system and dots prone to mechanical failure.

Other previous automatic curtain type signs utilizing various types of codes have been plagued with high voltage static electricity being generated by the curtains and coupled into the reader electronics causing system malfunction, ect.

SUMMARY OF THE PRESENT INVENTION

The present invention provides an information display system which overcomes all the previously known disadvantages of the previously known devices.

In brief, the system of the present invention comprises a housing having a viewing window. An elongated flexible MYLAR sheet is provided around spaced rollers within the Z housing so that a portion of the sheet extending between the rollers is visible through the window. Furthermore, a plurality of discrete visual messages are provided at longitudinal spaced positions along the MYLAR sheet. Thus, by rotating the rollers, different messages can be displayed.

A coded index, preferably a bar code, is associated with each discrete visual message on the MYLAR sheet.

A controllable motor, such as a stepping motor or DC motor, is provided within the housing to rotatably drive the rollers and thus the MYLAR sheet. Simultaneously, a fiber optic is employed in conjunction with a motor control module, "MCM", which reads the bar codes on the MYLAR sheet and provides an electrical output signal to the motor control module, "MCM", representative of the position of the sheet. The motor control module, "MCM", in turn, communicates with an encoder control module unit preferably positioned adjacent to the vehicle operator.

The encoder control module, "ECM", includes a keyboard and microprocessor so that the vehicle operator can input the desirable visual message into the keyboard at the encoder control module. Once the desirable visual message is inputted by the operator, the encoder control module outputs output signals representative of the desirable visual message to the motor control module, "MCM". The motor control module includes a microprocessor which generates output signals to selectively activate the motor to move the MYLAR sheet while simultaneously reading the position of the MYLAR sheet near the bar codes on the MYLAR sheet. When the MYLAR sheet is positioned at the appropriate position, the motor control module deactivates the motor and generates the return signal to the central control unit indicating successful execution of the command from the central control unit. In the event that the MYLAR sheet can not be properly positioned by the motor control module, an appropriate error signal is then generated from the motor control module back to the encoder control module.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
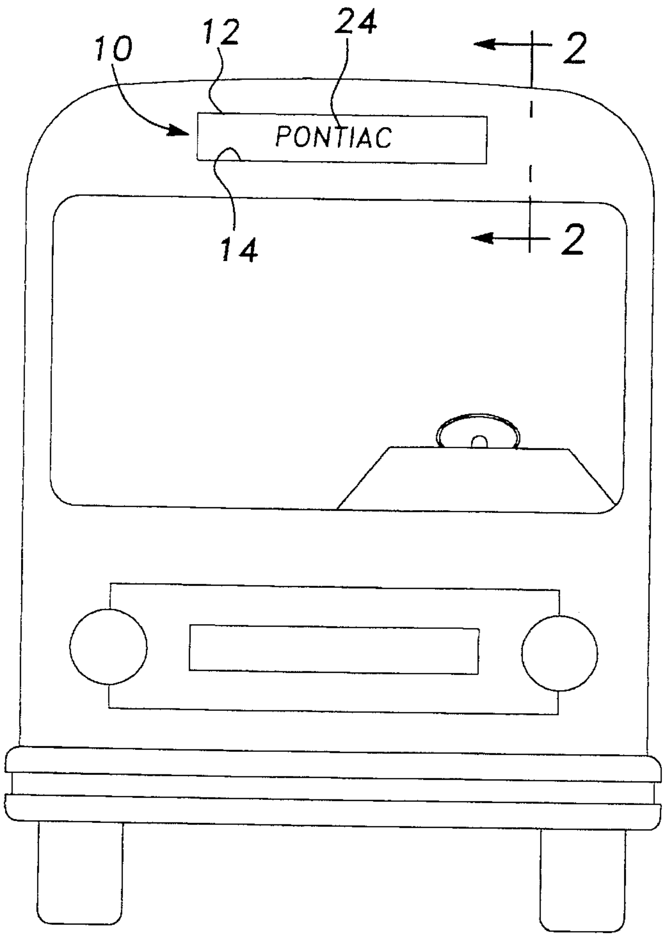
FIG. 1 is a plan view illustrating a portion of the display system of the present invention.

With reference first to FIG. 1, a portion of the preferred embodiment of the information display system 10 of the present invention is thereshown and comprises a housing 12 having a window 14. The housing 12, for example, would be positioned on the top front or top rear of a bus or other public transportation system.

Figure 2:
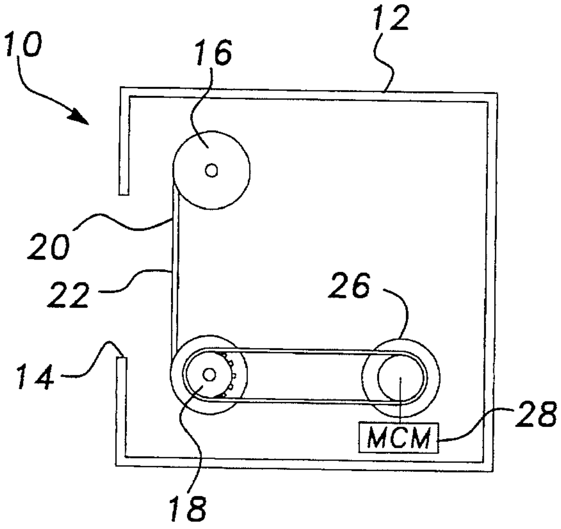
FIG. 2 is a side diagrammatic view of the portion of the display system of the present invention.

A pair of rollers 16 and 18 are contained within the housing 12 and an elongated flexible sheet or curtain 20 is wound around the rollers 16 and 18. Furthermore, as best shown in FIG. 2, the rollers 16 and 18 are spaced apart from each other so that a portion 22 of the flexible sheet 20 is positioned in alignment with the housing window 14. Preferably, the flexible sheet 20 is constructed of the MYLAR. Other materials, however, can alternatively can be used.

Still referring to FIGS. 1 and 2, a plurality of visual messages 24 (only one illustrated) are provided at longitudinal spaced intervals along the flexible sheet 20. Consequently, rotation of the rollers 16 and 18 will bring different visual messages into alignment with the housing window 14.

With reference now to FIG. 2, a reversible controllable motor 26, such as a stepping motor or DC servo motor, is drivenly connected with the rollers 16 and 18. Thus, activation of the motor 26 rotatably the rollers 16 and 18 in order to move the flexible sheet 20 and thus bring different visual messages 24 into alignment with the window 14. The motor 26 is reversible and directional self programming and thus can be driven in either direction. Furthermore, a motor control module 28 is associated with the motor 26. The motor control module 28 will be subsequently described in greater detail.

Figure 4:
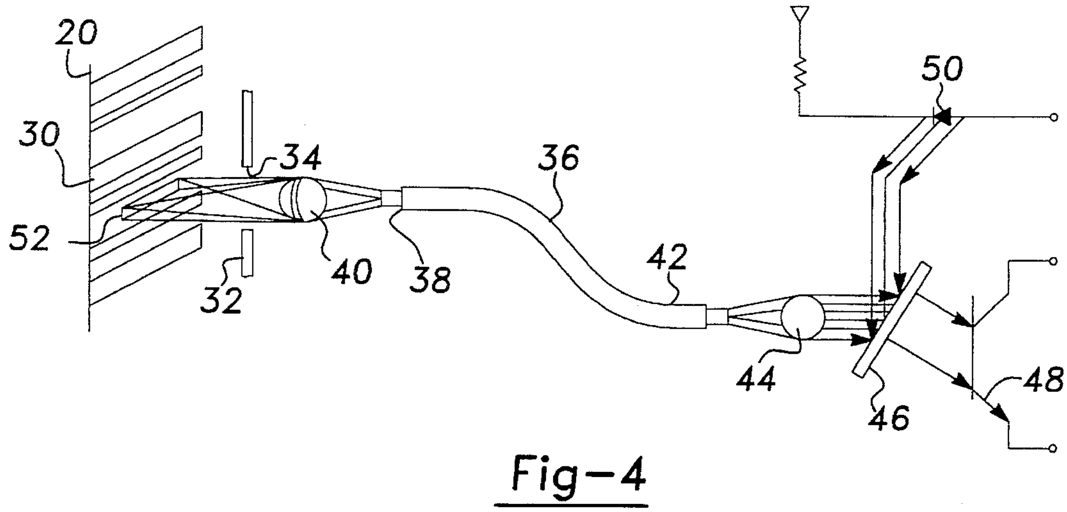
FIG. 4 is a diagrammatic view illustrating a portion of the present invention.

With reference now to FIG. 4, a coded index 30 is associated with each visual message 24 on the flexible sheet 20. Each index 30 is unique to its particular associated visual message and is preferably in the form of a bar code 30 printed on the flexible sheet 20. Preferably, the coded index 30 is provided along the sides of the flexible sheet 20 and each index is in a predetermined longitudinal position along with sheet 20 with respect to its associated visual message 24.

Still referring to FIG. 4, in order to read the index 30, a mechanical guide and aperture 32 is associated with the flexible sheet 20 to prevent flapping of the flexible sheet and focus the beam as it is driven by the motor 26. The guide 32 includes an aperture 34 in alignment with the coded index 30.

An elongated fiber optic 36 has one end 38 in alignment with the aperture 34. Preferably, a lens 40 is provided between the end 38 of the fiber optic 36 and the aperture 34. Thus, light emitting from the fiber optic 36 passes through the lens 40 and aperture 34 and illuminates the coded index while, conversely, reflected light passes through the aperture 34, lens 40 and back into the fiber optic 36.

The opposite end 42 of the fiber optic 36 is positioned in alignment with both a lens 44 and a beam splitter 46. The beam splitter 46 permits a portion, preferably half, of light emitted from the fiber end 42 to pass directly through the beam splitter 46 and to a light detecting transistor 48. This light detecting transistor 48 provides an electrical output signal proportional to illumination which impinges upon it.

A light emitting diode 50 is also provided in conjunction with the beam splitter. The light emitting diode 50 is positioned so that light which is emitted from the light emitting diode 50 reflects from the beam splitter 46, through the lens 44 and into the fiber optic 36.

In operation, it is necessary to illuminate the coded index 30 in order to read it. Thus, the light emitting diode 50 provides the illuminating through the lens 44, fiber optic 36 and lens 40 so that the output from the diode 50 impinges on the coded index 30 as indicated at 52. Reflection from the coded index 30 will pass in the opposite direction, i.e. through the lens 40, fiber optic 36 and through the lens 44. A portion of this reflected light passes directly through the beam splitter 46 and is detected by the photo transistor 48. This photo transistor 48 thus provides an electrical signal indicative of the magnitude of the reflected light from the coded index.

Figure 3:
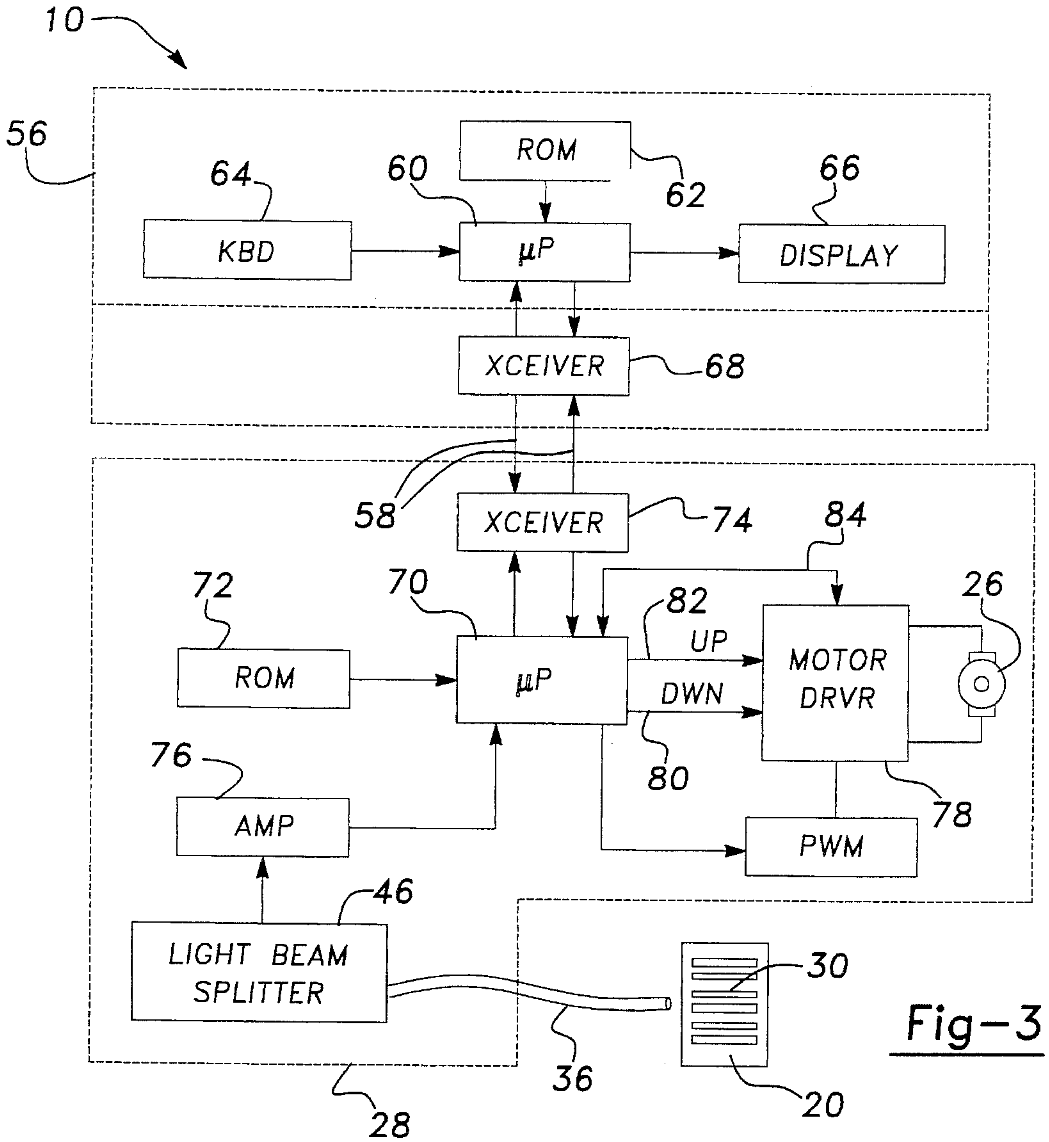
FIG. 3 is a block diagrammatic view of a preferred embodiment of the present invention.

With reference now to FIG. 3, a blocked diagram of the electronic portion of the system 10 of the present invention is thereshown. In addition to the motor control module 28 (see also FIG. 2) the system 10 includes a encoder control module 56 which is remote from the motor control module 28 and electrically connected to the motor module 28 by the electrical wires 58 or future addition of a fiber optic communication link between the ECM and MCMS.

In practice, a motor control module 28 is associated with each housing (sign frame) 12 (FIG. 1) containing one or more flexible sheets 20. In practice, a single motor control module can control three different curtains 20. Conversely, the encoder control module 56 is typically remotely positioned from the motor control module 28 and usually at a position which is easily accessible by the vehicle operator or other operator of the display system. Furthermore, although only one motor control module 28 is illustrated in the drawing, the central control unit 56 can be utilized to control multiple motor control modules 28. In this later event, the motor control module 28 each contains a unique address so that the motor control module 28 can be daisy chained together.

Referring now especially to FIG. 3, the encoder control module 56 includes a microprocessor 60 which executes a prestored computer program. This prestored computer program is preferably contained in external read only memory (ROM) 62 although other means can alternatively be used. In the well known fashion, the program in the read only memory 62 controls the operation of the microprocessor 60.

The microprocessor 60 also receives signals from a keyboard 64 which is manually operated by the system operator. For example, when it is desired to change the visual message 24, the system operator would type in the appropriate coding into the keyboard 64 which is then read by the microprocessor 60. Only one number set need be entered by the operator to place all MYLAR curtains at any combination of positions.

The microprocessor 60 also controls an output of a display 66 which can be read by the system operator. This display 66 can comprise vacuum fluorescent or light emitting diodes, LCDs and the like.

The microprocessor 60 also transmits and receives signals to the motor control module 28 via a communication transceiver 68.

Each motor control module 28 includes its own microprocessor 70 which is preprogrammed with its own read only memory 72. The motor control module 28 also includes a transceiver 74 which is electrically connected with the lines or fiber optic 58 and communicates with the transceiver 68 at the encoder control module 56. In practice, the microprocessor 60 at the encoder control module, "ECM", outputs signals through its transceiver 68 indicative of the desired or target visual message which is desired to be displayed by the motor control module 28 with its associated flexible sheet 20.

The output from the photo transistor 48 is coupled through an amplifier 76 and provides an input signal to the microprocessor 70. This input signal from the amplifier 76 is thus indicative of the coded index or bar code 30 on the flexible sheet 20 and thus indicative of the position of the flexible sheet 20.

The microprocessor 70 also provides several output signals to a motor driver circuit 78. These output signals include motor direction signals on lines 80 and 82 as well as a motor activating signal on line 84. The microprocessor 70 also is able to control the speed of the motor 26 by modulating the pulse width of the motor activation.

Figure 5:
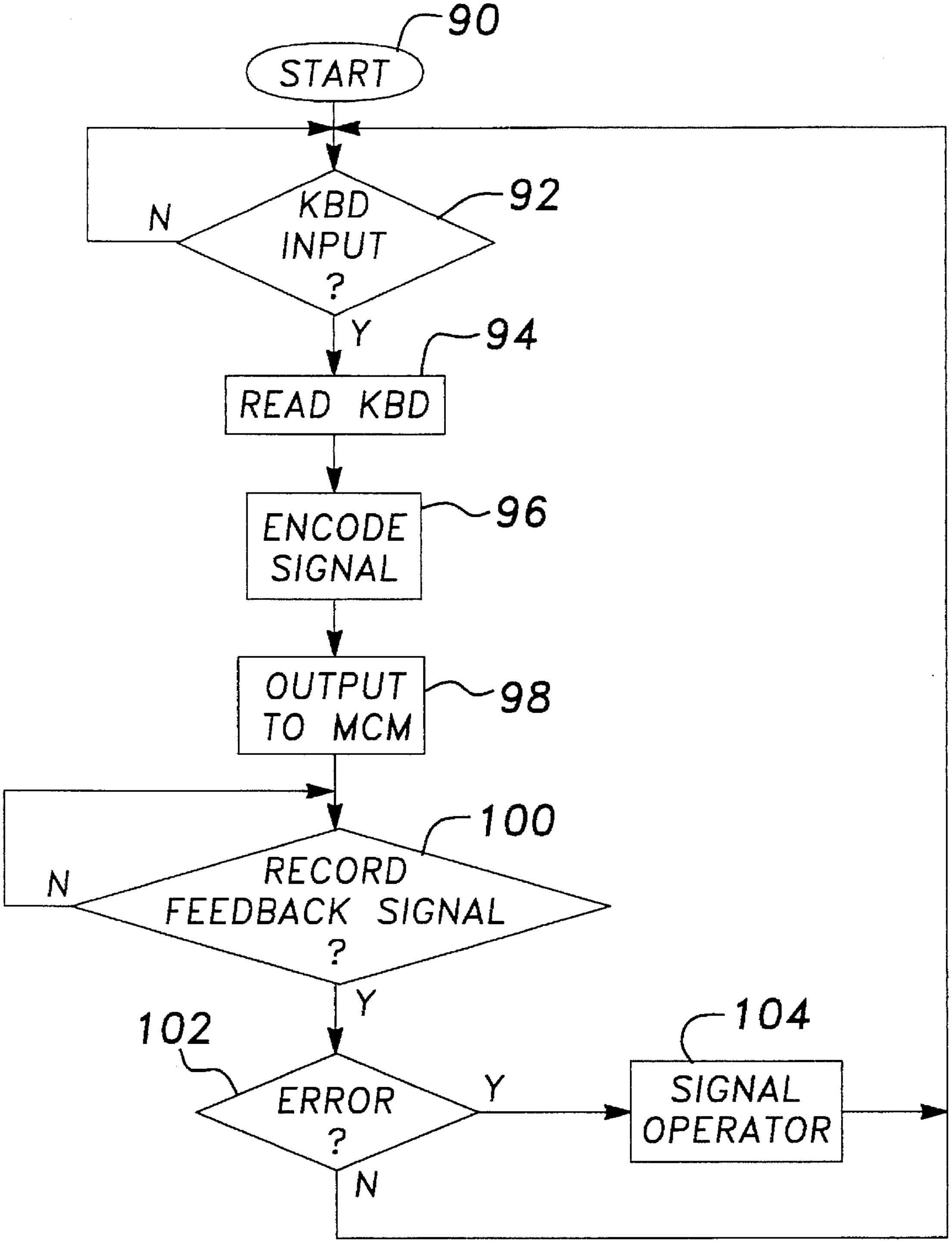
FIG. 5 is a flow chart illustrating the operation of the central control units.

With reference now to FIG. 5, a flow chart illustrating the operation of the central control unit is thereshown. The microprocessor begins executing at a start step 90 which then immediately exits to step 92. At step 92, the program determines whether or not there has been an input on the keyboard from the system operator. If not, step 92 simply reiterates.

Upon completion of a keyboard entry by the vehicle operator, step 92 exits to step 94 which then reads the keyboard input signal from the keyboard. Step 94 then branches to step 96.

At step 96, the microprocessor 60 determines the proper coded output signal that is necessary to not only select the correct motor control module 28, but also provide the proper code for the desired visual message on the flexible sheet 20. Typically, step 96 utilizes look up tables to determine the proper coding for the output signal although other methods can be alternatively be used.

After step 96 has determined the proper coded signal, step 96 branches to step 98 which then generates the coded output signal along its output lines 58 and to the motor control module 28 or modules 28. Step 98 then branches to step 100.

At step 100, the program delays until a return signal is received from the motor control module indicative that the target message id displayed in the window 14. Once the feedback signal is received, step 100 branches to step 102.

At step 102, depending upon the feedback signal received from the motor control module, the program determines if the operation was successfully completed. If so, step 102 branches to step 92 where the above process is repeated. Conversely, if the operation was not successful, as might occur during a jam of the flexible sheet 20, step 102 branches to step 104 which generates an output signal to the operator via the display 66 (FIG. 3) reporting the error condition. Step 104 then branches to step 92.

Figure 6:
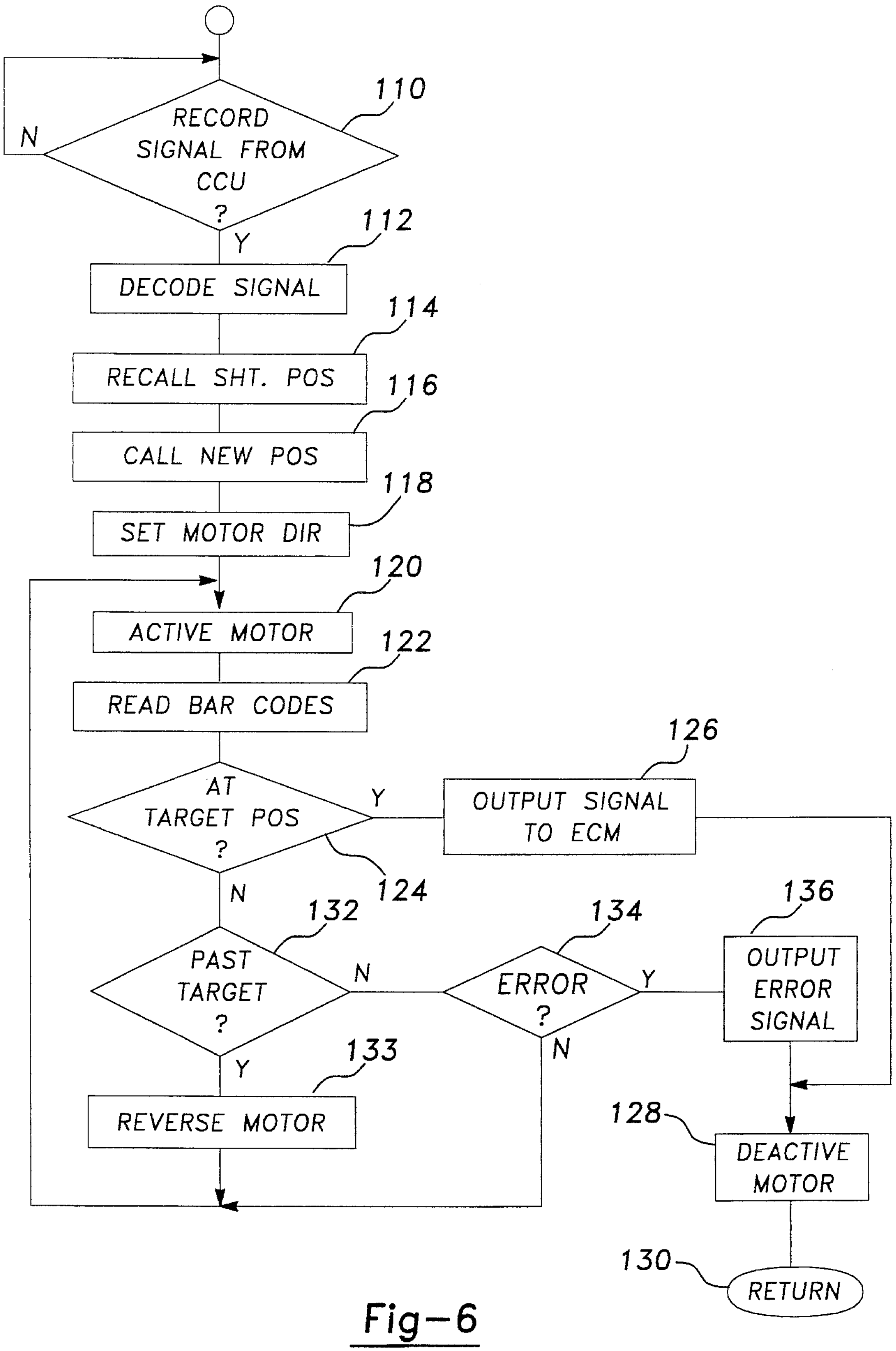
FIG. 6 is a flow chart illustrating the operation of the motor control module.

With reference now to FIG. 6, the operation of the computer program for the motor control module, i.e. for the microprocessor 70, is there illustrated. At step 110, the program delays until a signal is received from the encoder control module. When the signal is received, step 110 branches to step 112 which decodes the received signal from the encoder control module to determine not only if it is the selected motor control module, but, if so, the desired or target visual message to be displayed by the system. Step 112 then branches to step 114.

Step 114 recalls the current and previously stored position of the flexible sheet 20 and then branches to step 116 which calculates the direction necessary to obtain the target message. Step 116 then branches to step 118 which sets the direction of the motor activation.

Step 118 then branches to step 120 which activates the motor to move the sheet 20. Step 120 then branches to step 122 which reads the coded index 30 on the flexible sheet 20. Step 124 then determines if the target position has been reached.

If the target position has been reached, step 124 branches to step 126 which outputs an electrical signal along lines 58 to the encoder control module 56 indicating that the operation has been successful. Step 126 then branches to step 128 which deactivates the motor and then returns via step 130.

Conversely, if the target position has not been reached, step 124 branches to step 132 which determines if the target positioning has been passed. If so, step 132 branches to step 133 which changes the motor direction and then branches to step 120 where the above process is repeated.

Assuming that the target position has not been passed, step 132 will instead branch to step 134 which determines if an error condition is present. Such an error condition would be present, for example, during a jam of the flexible sheet 20. In this case, step 134 branches to step 136 which generates the appropriate error output signal to the central control unit 56 via the lines 58. Step 136 then branches to step 128 which deactivates the motor and then to step 130 to end the program.

Conversely, if no error signal is present, step 134 will instead branch to step 120 where the above process is repeated.

One important advantage of the present invention is that the direction of the curtain movement is self programming. Thus, even if the motor connectors are reversed, the computer program will automatically compensate and self correct.

From the foregoing, it can be seen that the present invention provides a simple, inexpensive and highly effective information display system which enjoys not only the high definition and easy readability of a printed MYLAR sheet, but which can also be activated and controlled remotely from the screen itself.

Having described my invention, however, many modifications thereto will become apparent to those skilled in the art to which it pertains without deviation from the spirit of the invention as defined by the scope of the appended claims.

I claim:

1. An information display system comprising:

a plurality of housings, each having a viewing window, a plurality of elongated flexible sheets, each said sheet having a plurality of discrete visual messages at longitudinally spaced intervals along each said sheet, a coded index associated with each discrete visual message on each said sheet, each said index having a predefined location on said sheet with respect to its associated visual message, means for movably mounting one of said sheets in each of said housings so that different visual messages are visible through each said window depending upon the position of each of said sheets in their respective housings, controllable motor means contained in each of said housings for moving said sheet associated with each of said housings, an encoder control module and a plurality of motor control modules positioned remotely from said encoder control module, one of said motor control module being positioned at each of said housings, wherein said encoder control module having means for receiving said return signal from each motor control module.

2. The invention as defined in claim 1 wherein said sheet comprises a MYLAR sheet and wherein said visual messages are imprinted on said MYLAR sheet.

3. The invention as defined in claim 1 wherein said coded index comprises a bar code inprinted on said sheet.

4. The invention as defined in claim 3 wherein said reading means comprises an optical fiber having one end adjacent said sheet and means adjacent the other end of said fiber for converting light to an electrical signal.

5. The invention as defined in claim 4 and comprising means for illuminating said coded index, said means for illuminating comprising a source of illumination directed at said other end of said fiber.

6. The invention as defined in claim 5 and comprising an optical lens positioned between said first end of said fiber and said sheet.

7. The invention as defined in claim 5 and comprising a beam splitter positioned in alignment with said other end of said fiber.

8. The invention as defined in claim 1 wherein said means for movably mounting said sheet comprises a pair of spaced rolls, said sheet being wound about each roll so that a portion of said sheet extending between said rolls is positioned in alignment with said window.

9. The invention as defined in claim 1 wherein said encoder control module comprises an alphanumeric display and means for generating output signals to said alphanumeric display representative of visual messages on said sheet.

10. The invention as defined in claim 1 wherein said motor is a stepping motor.

11. The invention as defined in claim 1 wherein said motor is a DC motor.

12. The invention as defined in claim 1 wherein each said motor control module comprises means for generating a pulsed output signal to control activation of said motor means, said generating means comprising means to vary the width of said pulses to thereby vary the speed of said motor means.

13. The invention as defined in claim 1 wherein said encoder control module comprises a microprocessor and each motor control module comprises a microprocessor.

14. The invention as defined in claim 1 wherein each said motor control module comprises means for generating a pulsed output signal to control activation of said motor means, said generating means comprising means to vary the duty cycle of said pulses to thereby vary the speed of said motor means.

* * * * *

UNITED STATES PATENT AND TRADEMARK OFFICE

CERTIFICATE OF CORRECTION

PATENT NO. : 5,597,994

DATED : January 28, 1997

INVENTOR(S) : Thomas Hornung

It is certified that error appears in the above-indentified patent and that said Letters Patent is hereby corrected as shown below:

Column 5, line 31, delete "id", insert --is--.

Column 6, claim 1, line 57, after "housings," insert

--wherein said encoder control module comprises, means for inputting data representative of a target visual display on each of said sheets, means for encoding said data so that said encoded data contains information representative of a target motor control module and said target visual display,

UNITED STATES PATENT AND TRADEMARK OFFICE
CERTIFICATE OF CORRECTION

PATENT NO. : 5,597,994 
DATED : January 28, 1997
INVENTOR(S) : Thomas Hornung

It is certified that error appears in the above-indentified patent and that said Letters Patent is hereby corrected as shown below:

means for transmitting said encoded data to said motor control modules, wherein each of said motor control modules comprises processing means independent of said encoder control module processing means comprising means for receiving said encoded data from said encoder control module, means for decoding said encoded data and generating a decoded signal representative thereof, means for reading said coded index and for providing an output signal representative thereof, means responsive to said output signal and said decoded signal for selectively activating said controllable motor means independently

UNITED STATES PATENT AND TRADEMARK OFFICE

CERTIFICATE OF CORRECTION

PATENT NO. : 5,597,994

DATED : January 28, 1997

INVENTOR(S) : Thomas Hornung

It is certified that error appears in the above-indentified patent and that said Letters Patent is hereby corrected as shown below:

of said encoder control module until the target visual message is displayed through said window, means for detecting when said target visual message is displayed through said window and for generating a completion output signal representative thereof, means responsive to said completion signal for generating a return signal to said encoder control module when said target visual message is displayed through said window, and--.

Signed and Sealed this

Seventeenth Day of June, 1997

Attest:

BRUCE LEHMAN

*Attesting Officer*

*Commissioner of Patents and Trademarks*